United States Patent [19]

Brems

[11] Patent Number: 4,490,091
[45] Date of Patent: Dec. 25, 1984

[54] SLAVE ROTATE MECHANISM FOR MECHANICAL HANDS OF GANTRY TYPE TRANSFER SYSTEM

[76] Inventor: John H. Brems, Apt. 16-D, 2800 S. Ocean Blvd., Boca Raton, Fla. 33432

[21] Appl. No.: 480,069

[22] Filed: Mar. 29, 1983

[51] Int. Cl.³ .................................................. B65G 47/34
[52] U.S. Cl. .................................. 414/749; 74/89.15; 414/735; 414/736
[58] Field of Search ............... 414/749, 750, 751, 753, 414/782, 783, 733, 736, 71, 728; 198/375, 486, 488; 74/27, 55, 89.15, 424.8 R

[56] References Cited

U.S. PATENT DOCUMENTS

| | | | |
|---|---|---|---|
| 1,869,622 | 8/1932 | Rowe | 414/733 |
| 3,095,082 | 6/1963 | Allgeyer | 414/733 X |
| 3,220,566 | 11/1965 | Rowe | 414/733 |
| 3,651,958 | 3/1972 | Evans et al. | 414/753 X |
| 3,667,114 | 6/1972 | Smith et al. | 414/728 X |
| 3,789,676 | 2/1974 | Brems | 74/29 X |
| 4,042,122 | 8/1977 | Espy et al. | 414/751 X |

Primary Examiner—Leslie J. Paperner
Assistant Examiner—Stuart Millman
Attorney, Agent, or Firm—Barnes, Kisselle, Raisch, Choate, Whittemore & Hulbert

[57] ABSTRACT

A mechanical transfer system for lifting and transferring work parts to load and unload fixtures and pallets in a path which includes vertical and horizontal motions. Mechanical hands are provided to grasp the parts and deposit them at a new location. A lifting beam carrying these hands is moved horizontally and also shifted by mechanically driven arms to provide a straight lift or lower action for the work parts at the beginning and end of the transfer path. A mechanism associated with the mechanically driven arms is actuated in response to the movement of the arms to change the orientation of the mechanical hands and the supported work part during the transfer motion so that a work part can be lifted in one orientation and deposited in another orientation.

11 Claims, 23 Drawing Figures

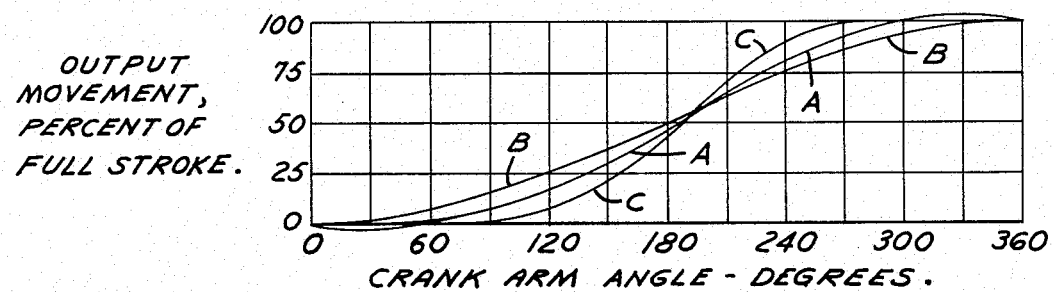
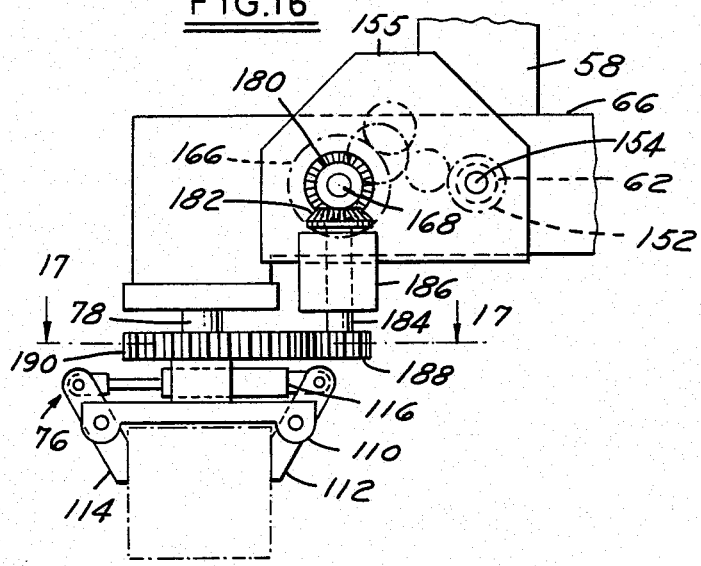
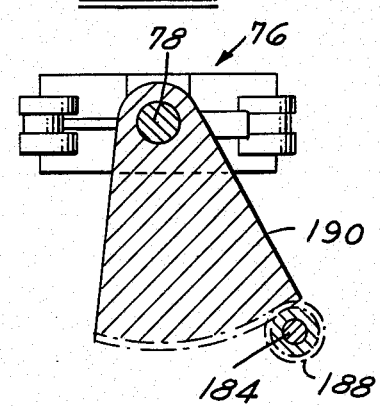
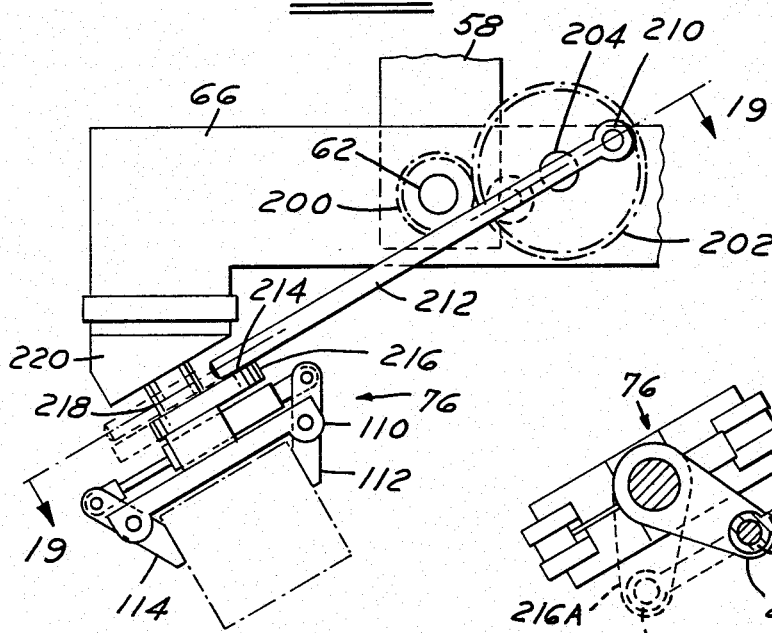
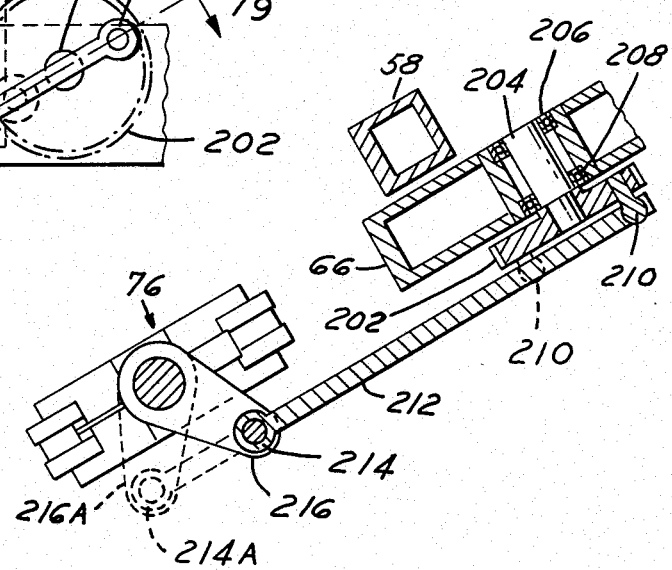

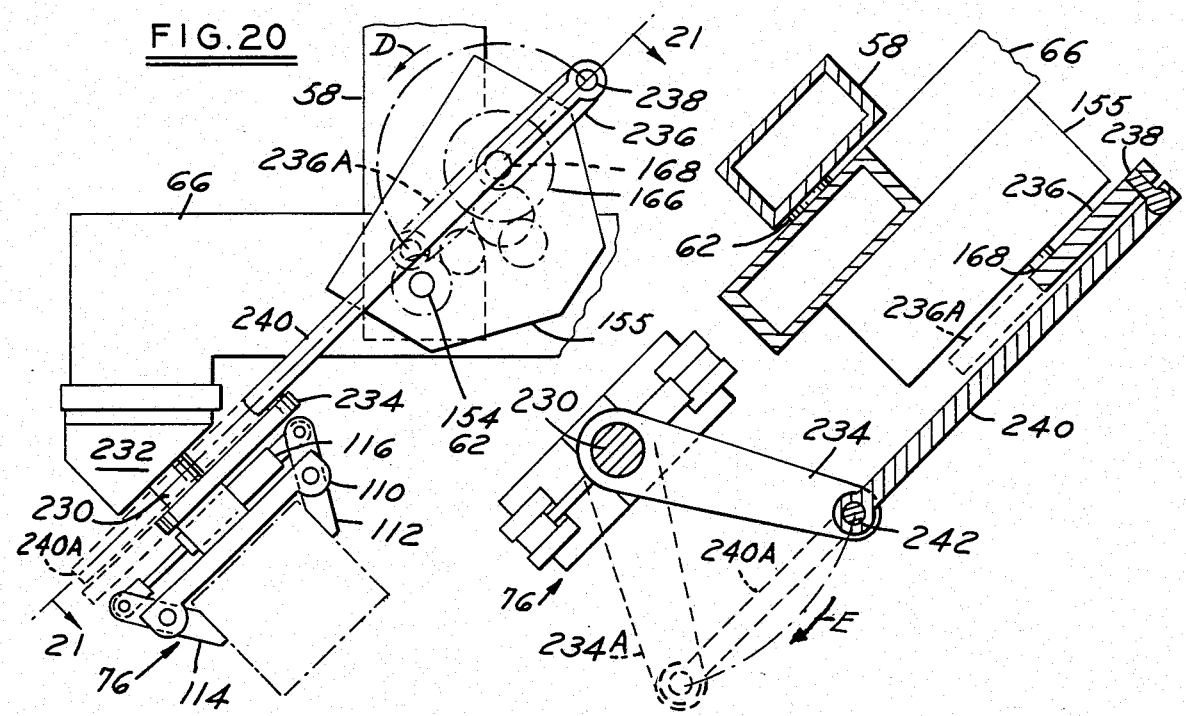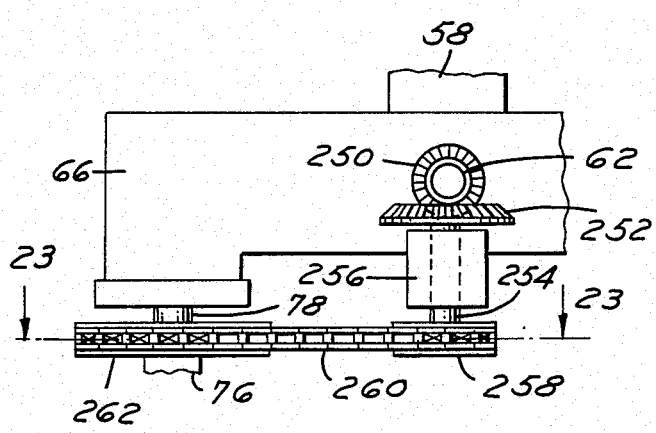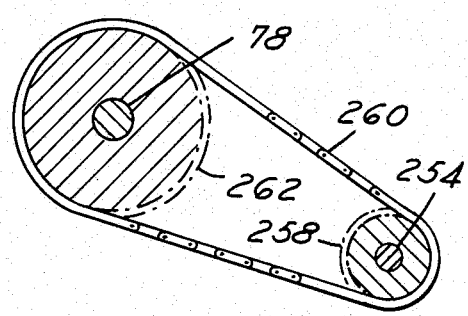

SLAVE ROTATE MECHANISM FOR MECHANICAL HANDS OF GANTRY TYPE TRANSFER SYSTEM

FIELD OF THE INVENTION

Workpiece transfer systems with a lift, transfer and lower mechanism utilizing mechanical hands which can rotate to different orientations.

BACKGROUND OF THE INVENTION

In the field of workpiece transfer systems, a technique is disclosed in my copending U.S. application, Ser. No. 452,327, filed Dec. 22, 1982, in which a transfer beam is moved parallel to itself along an overall path comprised of a vertical or other predetermined lift path followed by a substantially horizontal curved path, followed by a vertical or other predetermined lowering path. A series of one or more mechanical hands mounted on this transfer beam are utilized to grasp and transfer workpieces from one set of positions to another, as exemplified by the progressive transfer of workpieces along a transfer line. The motion of the transfer beam is created, in part, by the movement of a carriage along a structural support beam, on which are mounted two rotating crank arms which support and drive the transfer beam through crankpins while rotating with respect to the carriage and transfer beam. In this arrangement, the mechanical hands are rigidly connected to the transfer beam, and therefore a given workpiece is lowered and deposited at the end of a transfer stroke in the same spatial orientation in which it had been picked up and lifted at the beginning of the transfer stroke.

Applications arise in which it is desirable or necessary to alter the spatial orientation of a given workpiece as it is being transferred from its pickup to its deposit point. It is one object of this invention to provide a system in which the spatial orientation of a mechanical hand and the workpiece it carries is altered during the transfer motion and that this be accomplished by employing the relative motion of the crank arms with respect to the transfer beam.

In most applications, it is desirable or necessary that the spatial orientation of a workpiece not be altered during the vertical lifting and lowering portions of the transfer stroke, since this would create interference problems with the pallets, fixtures, or other workholding devices from which a workpiece is removed or into which it is delivered. It is another object of this invention to provide a system in which the spatial reorientation of a given workpiece is generated only during the substantially horizontal portion of the transfer path, and that the spatial orientation remain substantially fixed during the lift and lower portions of the transfer path.

Other objects and features of the invention will be apparent in the following description and claims in which the best modes of the invention are set forth together with the principles of operation and details to enable persons skilled in the art to practice the invention.

BRIEF DESCRIPTION OF THE DRAWINGS

DRAWINGS acccompany the disclosure and the various views thereof may be briefly described as:

FIG. 15, a graph showing the output characteristics of the mechanism of FIG. 9, the output characteristics of the crankdrive mechanism shown in FIGS. 18 and 19, and the output characteristics of both mechanisms combined as shown in FIGS. 20 and 21.

FIG. 16, a view, analogous to FIG. 4 showing the mechanism of FIG. 9 employed for rotating the mechanical hand during transfer, in another embodiment of this invention.

FIG. 17, a section taken on line 17—17 of FIG. 18.

FIG. 18, a view, analogous to FIG. 4 showing a crank drive mechanism employed for rotating the mechanical hand during transfer, in another embodiment of this invention.

FIG. 19, a section taken on line 19—19 of FIG. 18.

FIG. 20, a view, analogous to FIG. 4 showing the mechanism of FIG. 9 driving the crank mechanism of FIG. 18 to rotate the mechanical hand during transfer, in another embodiment of this invention.

FIG. 21, a section taken on line 21—21 of FIG. 20.

FIG. 22, a view, analogous to FIG. 4 showing a direct drive mechanism between the driving crank arm and the mechanical hand, in another embodiment of this invention.

FIG. 23, a section taken on line 23—23 of FIG. 22.

DETAILED DESCRIPTION OF THE INVENTION AND THE MANNER AND PROCESS FOR USING IT

In my copending patent application, Ser. No. 452,327, referenced above, there is disclosed a gantry mechanism which is capable of lifting one or more workpieces in a vertical or other predetermined path, then moving those workpieces along a generally horizontal path, and finally lowering those workpieces in a vertical or other predetermined path. This mechanism will be briefly reviewed, insofar as it relates to the invention disclosed herein, through FIGS. 1 and 2.

Figure 1:
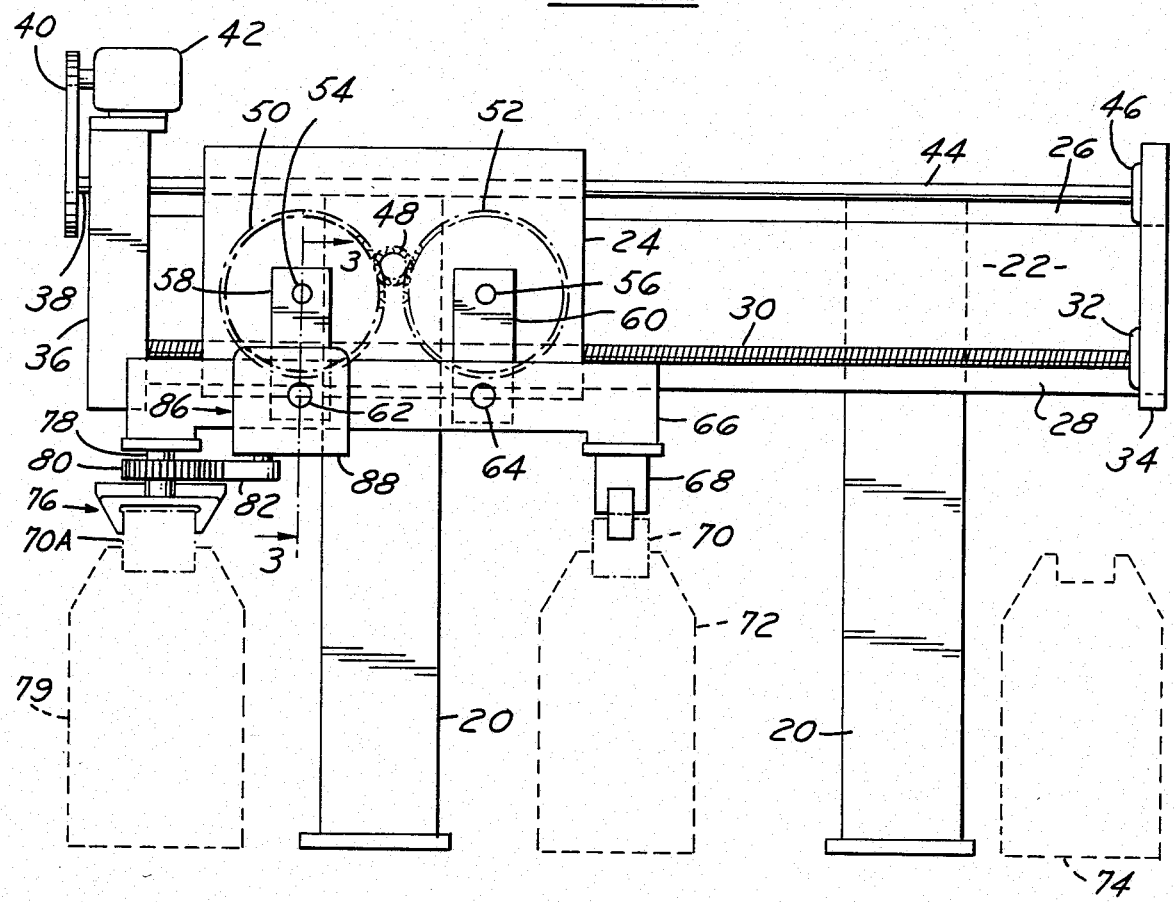
FIG. 1, a front elevation showing a gantry transfer system employing one embodiment of this invention.

Referring to FIG. 1, two columns 20 support a structural beam 22, on which is movably mounted a carriage 24; this carriage 24 is supported on an upper transfer rail 26 and a lower transfer rail 28 on which it can roll or slide along the horizontal axis of the structural beam 22. The carriage 24 is driven along this axis by a lead screw 30, which, at its one end, is supported by a pillow block 32 mounted on an end plate 34 supported from the structural beam 22. At its other end, the lead screw 30 is supported by and driven from a transfer gear case 36 mounted on the other end of structural beam 22. Within this gear case 36 is mounted a gear train, not shown, which originates in an input shaft 38 driven through belts and pulleys 40 from a drive motor 42.

A ball spline shaft 44 is also supported from and driven by the transfer gear case 36; it passes through the carriage 24 and is supported at its other end by pillow block 46 mounted on the end plate 34. Within the carriage 24, a ball spline nut and gear train (not shown) interconnect the ball spline shaft 44 and a driven pinion 48; this drive pinion 48 meshes with and drives bull gears 50 and 52 mounted on shafts 54 and 56 respectively which are suitably journalled in the carriage 24. A crank arm 58 is mounted on and rotates with the bull gear 50, and a crank arm 60 is mounted on and rotates with the bull gear 52. Both crank arms 58 and 60 terminate in crankpins 62 and 64 through which they are rotatably connected to a transfer beam 66.

As previously noted, the lead screw 30 drives the carriage 24 along the structural beam; this is accomplished through a ball lead screw nut, not shown, which is engaged by the ball lead screw 30. This ball lead screw nut is mounted on a compensator block which is movable on the carriage 24 and controlled through a cam which thereby modifies the movement of the carriage so as to achieve a true vertical motion of the transfer beam at each end of the stroke.

The ball spline shaft 44 and lead screw 30 are driven in synchronism from the gear case 36. This causes the carriage 24 to move along the axis of the structural beam 22, while simultaneously the drive pinion 48 drives both bull gears 50 and 52 and the crank arms 58 and 60 mounted thereon in rotation about the axes of shafts 54 and 56 on the carriage 24. The synchronous rotation of the crank arms 58 and 60 and crankpins 62 and 64 cause the transfer beam 66 to translate in a circular path with respect to the carriage 24 while that carriage is moving along the axis of the structural beam 22. A more detailed description of these movement interrelationships is presented in the referenced copending U.S. application, Ser. No. 452,327.

Figure 2:
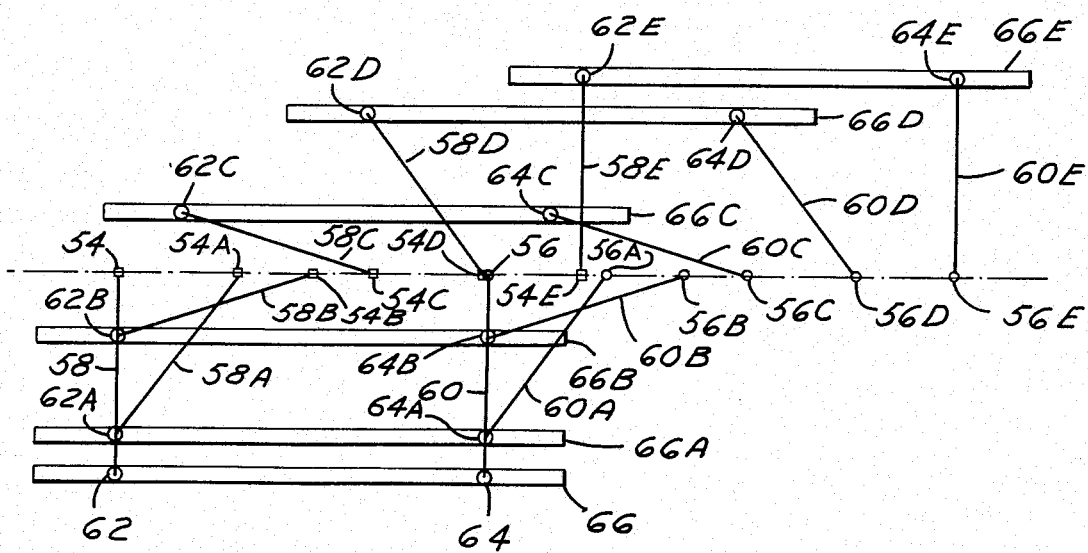
FIG. 2, a schematic diagram showing the operation of the basic gantry transfer system at six movement positions during half of a transfer motion.

A graphical representation of the path of the transfer beam is shown in the schematic diagram, FIG. 2. This shows the position of the transfer beam 66, crank arms 58 and 60, and the centerlines of shafts 54 and 56 at six different positions of the mechanism. The first position shows these elements in their starting position corresponding to the position shown in FIG. 1; in this position the elements are called out without suffix letters. After the crank arms have been rotated through an angle of 36 degrees, the position reached is shown by the elements having a suffix letter A. Similarly, after the crank arms have been rotated through an angle of 72 degrees from the starting position, the position reached is shown by the elements having a suffix letter B. Continuing, the suffix letter C denotes 108° rotation of the crank arms, D denotes 144° and E denotes 180°, which represents midstroke. The other half of the cycle is a mirror image of this first half shown.

The movement of the transfer beam relative to the carriage and its movement path in space may be visualized by the schematic diagram of FIG. 2. The consideration which is relevant to this new invention, which is also easily seen through FIG. 2, is that as the crank arms 58 and 60 rotate clockwise with respect to the carriage, they also rotate clockwise relative to the transfer beam 66 about crankpins 62 and 64. It is this relative rotation of the crank arm 58 with respect to the transfer beam 66 which provides the motivation for the systems to be described.

The mechanism described above is a brief review of one of the embodiments of my copending U.S. application, Ser. No. 452,327. Other embodiments disclosed therein show variations in the drive system, but all still retain the relevant property of having a crank arm rotate relatively with respect to the transfer beam.

Referring again to FIG. 1, a mechanical hand 68 is rigidly attached to one end of the transfer beam 66, as are the hands shown in the referenced copending U.S. application. During a full transfer stroke, this mechanical hand 68 transfers a workpiece 70 from one stationary workpiece holding station 72 to another workpiece holding station 74 without changing the spatial orientation of the workpiece. These workpiece holding stations 72 and 74 may be fixtures, pallets, stations on a multistation processing line, or other similar stations.

A second mechanical hand 76 is also carried by the transfer beam 66. However, this second mechanical hand 76 is mounted to the transfer beam 66 through a vertical shaft 78 journalled in the transfer beam 66 whereby the second mechanical hand 76 is rotatable on a vertical axis with respect to the transfer beam 66.

The second mechanical hand 76 operates on a workpiece 70A in transferring that workpiece from the stationary workpiece holding station 79 to the workpiece holding station 72. During this specific transfer the workpiece 70A is rotated about a vertical axis through an angle of 90°, changing its spatial orientation when deposited in station 72 as compared to its orientation when picked up in station 79. The means for changing this orientation will now be described.

Figure 3:
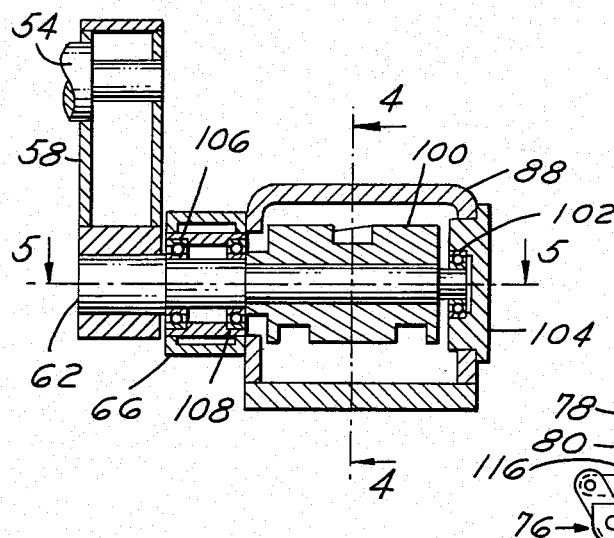
FIG. 3, an enlarged partial section taken on line 3—3 of FIG. 1.
Figure 4:
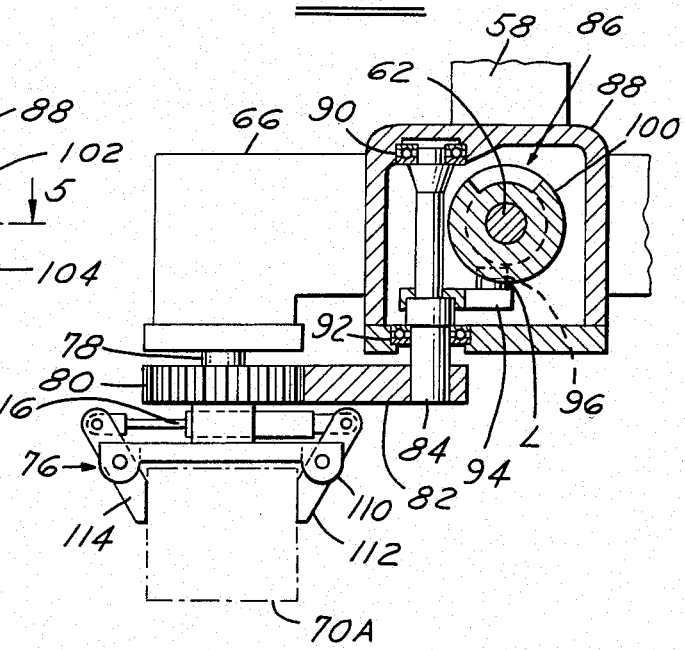
FIG. 4, a section taken on line 4—4 of FIG. 3.
Figure 5:
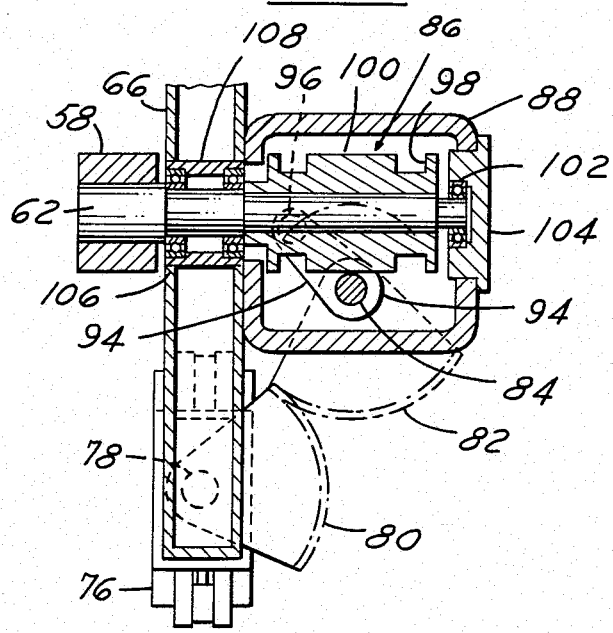
FIG. 5, a section taken on line 5—5 of FIG. 3.

Referring also to FIGS. 3, 4 and 5, a sector gear 80 is mounted to the shaft 78; this sector gear meshes with and is driven by a drive sector gear 82 mounted on the output shaft 84 of a cam index mechanism 86 contained in a housing 88, mounted to the transfer beam 66. The output shaft 84 is journalled in the housing 88 through bearings 90 and 92, and, within the housing 88, supports a follower arm 94, whose outboard end carries a cam follower roller 96. This cam follower roller 96 is closely fitted into a cam groove 98 formed into a cylindrical cam 100. The cylindrical cam 100 is mounted on and rotates with the crankpin 62, whose outboard end is supported by a bearing 102 fitted into a cover 104 in the housing 88. As noted before, the crankpin 62 is mounted on the crank arm 58; it is journalled to the transfer beam 66 through bearings 106 and 108 (FIG. 3).

Figure 6:
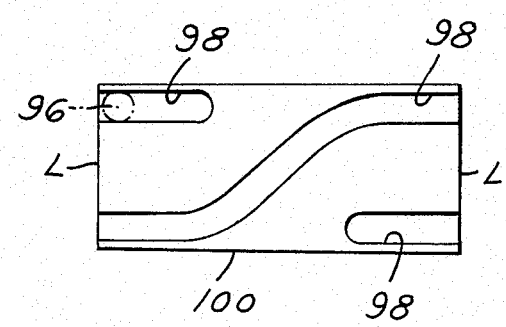
FIG. 6, a developed view of the cam utilized in the mechanism of FIGS. 3, 4 and 5.

The contour of the cam groove 98 is most easily visualized by referring to the cam development, FIG. 6, in which the cylindrical surface of the cam is "unrolled" by cutting it along a line L as noted in FIG. 4.

During a forward transfer cycle, as depicted by FIG. 2, it can be seen, as the crank arm 58 rotates clockwise with respect to the transfer beam 66 and the housing 88, that the cam 100, rotating with the crankpin 62, rotates clockwise within the housing 88. During a full forward transfer cycle, the cam 100 rotates 360° clockwise within the housing 88; and during a full return transfer cycle, the cam 100 rotates 360° counterclockwise.

Relative to the cam groove profile illustrated by FIG. 6, a clockwise rotation of the cam is the equivalent of that profile moving left to right with respect to the cam follower roller 96. With this in mind, it can be seen that during the first approximate 80° of cam rotation (approximately equivalent to position "B" of FIG. 2), the cam follower roller 96 remains in "dwell" and there is no movement of the follower arm 94 or output shaft 84. After approximately 80° of clockwise cam rotation and until approximately 280° of such rotation, the cam groove causes the cam follower roller to rotate the follower arm 94 and the output shaft 84 approximately 90° clockwise as viewed in FIG. 5. During the final 80° of cam rotation in the forward transfer movement, the cam follower roller 96 is again in "dwell" but in the 90° displaced position of the output shaft 84. During the return stroke of the transfer beam, these output motions are also reversed.

The rotation of the output shaft 84 described above is transmitted to the shaft 78 and mechanical hand 76 through the gears 80 and 82. In this illustrative situation, the gear ratio is 1:1 and the shaft 78 and mechanical hand 76 rotate counterclockwise 90° when driven by the 90° clockwise rotation of the output shaft 84.

The illustrative conventional mechanical hand 76 is comprised of a frame 110 (FIG. 4) on which are pivotally mounted two fingers 112 and 114. These fingers are actuated by a common air or hydraulic cylinder 116, which, when valved to expand, causes the two fingers to grasp the workpiece 70A; and, when valved to contract, causes the two to release the workpiece. The mechanical hand 68 is substantially identical with the mechanical hand 76, except that it is fixed to the transfer beam 66, rather than being rotatably mounted thereon; and it is oriented 90° different from hand 76 as viewed in FIG. 1.

A composite transfer forward index cycle may therefore be described as follows. With both hands 68 and 76 engaging their respective workpieces, the motor is started driving the carriage to the right and causing the crank arms to rotate clockwise with respect to the carriage as shown in FIG. 2. The cam is driven clockwise in its housing by the relative rotation of the crank arm 58 with respect to the transfer beam. During the first approximate 80 degrees of crank arm rotation, the workpieces are lifted vertically and without rotation due to the dwell of the cam. This is significant because in many applications, rotation of the workpiece during the lift portion of the transfer would create an interference with the fixture or pallet in the workholding station.

From approximately 80° to 280° of crank arm rotation, the transfer beam moves to the right as shown in FIG. 2. Superimposed on this motion is the rotation of the hand 76 and workpiece 70A about the vertical axis of the shaft 78 as previously described; no rotation of hand 68 and workpiece 70 takes place. After approximately 280° of crank arm rotation, the full horizontal stroke is completed, and the rotation of the hand 76 and workpiece 70A is also completed. Therefore, during the lowering portion of the transfer which takes place from approximately 280° to 360° of crank arm rotation, the hand 76 and workpiece 70A are lowered into station 72 without workpiece rotation about the vertical axis, again due to the cam dwell. This is again important in many appliations because of possible interference between the workpiece and the fixture or pallet in the workholding station 72.

At the completion of this forward transfer stroke, both hands 68 and 76 are opened by retraction of the cylinders 116. The motor is reversed and the opened hands return to their starting position. During this return stroke, the hand 76 is rotated in reverse so it is properly oriented to pick up the next workpiece in station 79 which has, in the meantime, been delivered by some other device. Again, the reverse rotation of the open hand 76 takes place only during the horizontal portion of the transfer return stroke, being angularly stationary during the vertical raising and lowering portion of the stroke.

In the embodiment described above, the rotation of the workpiece, which will be termed a "slave" rotate, was shown as taking place about a vertical axis. Other situations arise in which it is desired to change the spatial orientation of a workpiece during transfer by rotation about some other axis. Another such illustrative example is shown in FIGS. 7 and 8.

Figure 7:
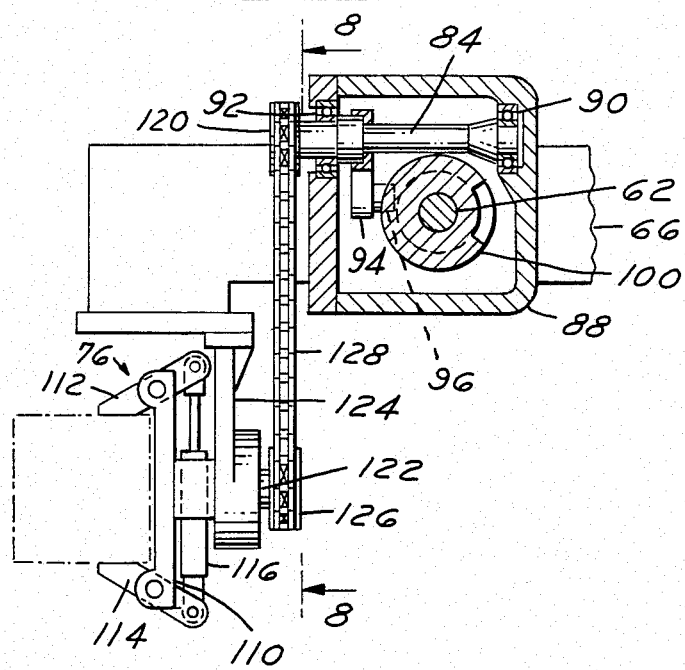
FIG. 7, a section analogous to FIG. 4 showing another embodiment of this invention.
Figure 8:
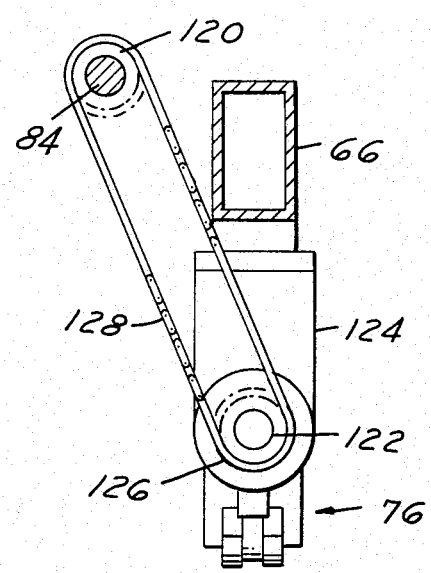
FIG. 8, a section taken on line 8—8 of FIG. 7.

Referring to FIGS. 7 and 8, the housing 88 is mounted to the transfer beam 66 in an attitude 90° different from that shown in FIG. 4, such that the output shaft 84 rotates about a horizontal axis. It will be understood that the other elements in the housing 88 are as has been previously described, and that the cam 100 has been reoriented on the crankpin 62, such as to provide the proper positioning of its dwell portions relative to crank arm rotation. A sprocket 120 is fastened on the outboard end of the output shaft 84 for rotation of the hand. The mechanical hand 76 is mounted on a shaft 122 journalled in a bracket 124 mounted on the transfer beam 66; at its other end the shaft 122 is driven by a sprocket 126 interconnected to sprocket 120 by chain 128. In this embodiment, it can be seen that the mechanical hand 76 will be driven about a horizontal axis in the same manner and with the same movement profile as was accomplished in the prior embodiment about a vertical axis.

The ratio shown between sprockets 120 and 126 is shown as 1:1; therefore, the angle of rotation of the mechanical hand will again be 90°. Clearly this ratio can be changed to provide a different rotation angle such as 45° or 180°; this can be accomplished with equal ease in the prior embodiment by changing the gear ratio between gears 80 and 82. Furthermore, the axis of rotation for the reorientation of the mechanical hand during transfer can be anywhere required by suitable design of bracket 124 and positioning of the housing 88 on the transfer beam 66.

The cam system illustrated in these first two embodiments utilizes a cylindrical cam to generate a 90° output angle. It is equally possible to generate different output angles if this is more convenient. Similarly, in some applications, a plate cam or other cam system may be successfully utilized.

While a cam and cam follower interconnection system between the crankpin and the rotating mechanical hand is desirable because a dwell at each end of the stroke is easily obtained, other dwell producing mechanisms are also usable.

One example of such an alternate mechanism is illustrated in FIGS. 9 to 14 which comprises one embodiment of my U.S. Pat. No. 3,789,676; this will be briefly reviewed.

Figure 9:
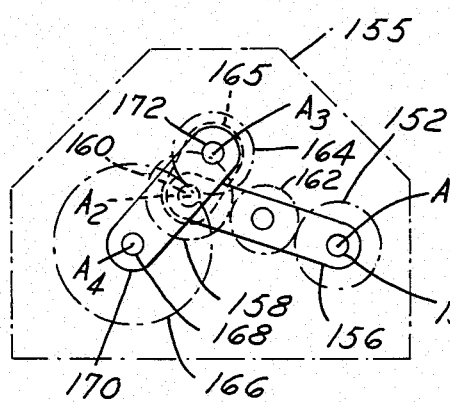
FIG. 9, a semi-schematic front view of a mechanism which is one embodiment of the mechanisms disclosed in my U.S. Pat. No. 3,789,676, dated Feb. 5, 1974.
Figure 10:
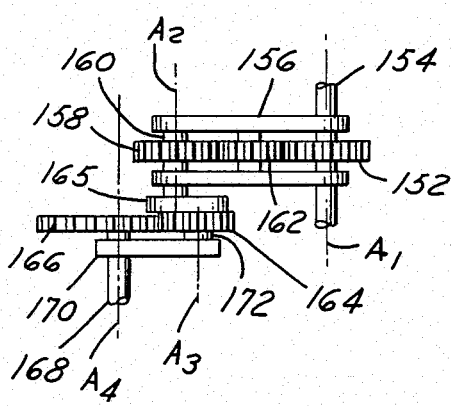
FIG. 10, a plan view of the mechanism of FIG. 9.

Referring to FIGS. 9 and 10, an input gear 152 is mounted on an input shaft 154 which is journalled in a housing or frame 155 on axis $A_1$ and driven by an appropriate external drive system; a typical housing 155 is shown in phantom for application reference. Also journalled on the input shaft 154 is a tangential link 156 which oscillates thereon as will be described. A driving gear 158 is mounted on a shaft 160 journalled in the outboard end of the link 156 on axis $A_2$, and, an intermediate gear 162, also journalled in the link 156, is formed to mesh with the input gear 152 and driving gear 158. An eccentric gear 164 is mounted on the shaft 160 through a cheekplate 165 with an eccentricity approximately equal to its pitch radius. This eccentric gear 164, rotating on a moving axis $A_3$, meshes with an output gear 166 mounted on a shaft 168 also journalled in the housing 155 on axis $A_4$. A radial link 170 is also journalled on the output shaft 168 at its one end; at its other end, the radial link 170 is journalled to a stub shaft 172 on axis $A_3$ mounted concentrically on the eccentric gear 164. It is the purpose of this radial link 170 to keep the eccentric gear 164 in mesh with the output gear 166 as the eccentric gear 164 moves through its rotational and translational path.

When the mechanism is in the position shown in FIG. 9, it is in a natural dwell position, i.e., a small rotation of the input gear 152 causes a corresponding rotation of the driving gear 158 and the eccentric gear 164, but this rotation of the eccentric gear 164 is accompanied by a corresponding movement of the shaft 172 about the output shaft 168, such that the gear 164 literally rolls about the output gear 166 which remains nearly stationary or in dwell.

Figure 11:
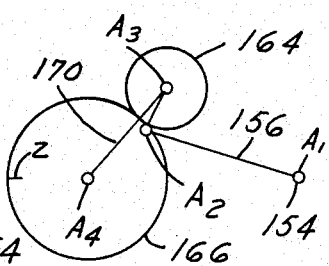
FIG. 11, a schematic representation of the mechanism of FIG. 9 shown at the starting and stopping point of an index cycle.

A qualitative schematic representation of the motion of the output gear 166 during a complete 360° rotation of the driving gear 158 and eccentric gear 164, at 90° intervals, is shown in FIGS. 11–14. An arbitrary radial marker line Z has been added to the output gear 166 to show its position change at these intervals. FIG. 11 shows the position of all gears at the center of the dwell, which is the same configuration as shown in FIG. 9.

Figure 12:
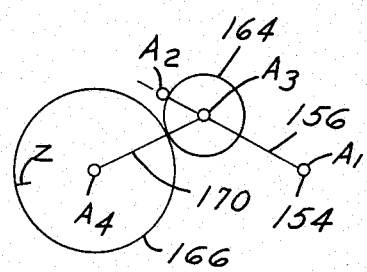
FIGS. 12, 13 and 14, schematic representations of the mechanism of FIG. 9 shown after rotation of the input shaft through angles of 90°, 180° and 270° respectively.

After 90° of clockwise rotation of gears 164 and 158, the position shown in FIG. 12 is reached. At this point, the acceleration of gear 166 in the counterclockwise direction has reached its approximate maximum, and the velocity of the gear 166 in the counterclockwise direction is approximately equal to its average velocity.

Figure 13:
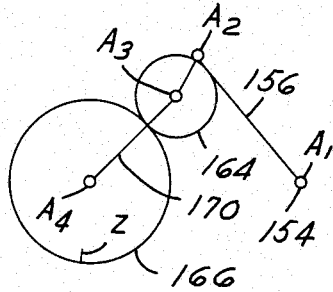

As the gears 158 and 164 continue their rotation clockwise from their position shown in FIG. 12, the output gear 166 continues to accelerate, at a decreasing rate, in the counterclockwise direction. After an additional 90° of rotation of gears 164 and 158, the positions shown in FIG. 13 is reached. At this point, the acceleration of the gear 166 has substantially returned to zero, and its velocity in the counterclockwise direction has reached an approximate maximum which is approximately double the average velocity.

Figure 14:
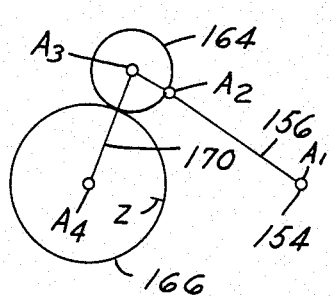

As the gears 158 and 164 continue to rotate clockwise from the position shown in FIG. 13, the output gear 166 continues to rotate counterclockwise but is decelerating. After an additional 90° of rotation of gears 158 and 164, or a total of 270° from the start of the cycle, the position shown in FIG. 14 is reached. At this point, the deceleration of the output gear 166 is at or near maximum, while the velocity of the output gear 166, still in the counterclockwise direction, has slowed down to approximately its average velocity.

As the gears 158 and 164 continue to rotate clockwise from the position shown in FIG. 14, the output gear 166 continues to rotate counterclockwise, but is still decelerating, though now at a decreasing rate. After an additional 90° of rotation of gears 158 and 164, or a total of 360° from the start of the cycle, the position shown in FIG. 11 is again reached, with the output gear 166 having completed 180° of rotation and is now again in dwell.

It can be seen, therefore, that as the input gear 152 is driven by some external power means, such as the crankpin 62, at a substantially constant angular velocity, the gears 158 and 164 are driven by the intermediate gear 162. Gears 154 and 164 have an angular velocity which is determined by the superposition of the effect of the oscillation of link 156 about shaft 154 on the velocity created by the input gear 152 so gears 158 and 164 do not rotate at a constant angular velocity. And the oscillation of the gear 164 along the arcuate path controlled by radial link 170 and created by its eccentric mounting on shaft 160 creates another superposition on the velocity of the output gear 166. With the proportions shown in FIGS. 9 to 14, the output gear 166 will come to a complete stop or dwell once every 180°, since the pitch diameter of gear 164 is shown as being one-half the pitch diameter of gear 166.

With the mechanism shown in FIG. 9, the output motion of gear 166 has the broad characteristics of cycloidal motion with a slight reversal of the output in the dwell region. The detailed characteristics of this mechanism are graphically shown by curve A of FIG. 15. The input axis is labelled in terms of crank arm angle, presuming that the input shaft 154 is directly coupled to the crankpin 62 of the basic transfer system; the output axis is labelled in percent of full stroke such that the data is equally applicable to a variety of gear or sprocket ratios between the output shaft 168 and the rotatable mechanical hand.

The data from which curve A of FIG. 15 was drawn was calculated using numerical methods as is explained in more detail in the aforesaid U.S. Pat. No. 3,789,676.

While the dwell characteristics of the mechanism of FIG. 9 are slightly inferior to those of the cam mechanism described in the first two embodiments, it is still very suitable as an alternate dwell producing mechanism for many applications. In such cases, it would directly replace the cam mechanism in housing 88.

An illustrative application with a vertical axis of rotation for the mechanical hand is shown in FIGS. 16 and 17. Referring to these figures, the mechanism of FIG. 9 is enclosed in the housing 155 which is mounted on the transfer beam 66. The input gear 152 on input shaft 154 of this mechanism is directly coupled to or made integral with the crankpin 62 through which the transfer beam is pivotally connected to the crank arm 58. The output shaft 168 of the mechanism of FIG. 9 extends through the housing 155 and mounts a driving bevel gear 180; this gear 180 is formed to mesh with a driven bevel gear 182 mounted on a vertical shaft 184 journalled in a bearing block 186 mounted externally to the housing 155. A pinion gear 188 is mounted on the lower end of the shaft 184; this gear is formed to mesh with a sector gear 190 mounted on the shaft 78 journalled in the transfer beam 66. The mechanical hand 76 is mounted on the lower end of the shaft 78 as previously described.

The ratio between the bevel gears 180 and 182 is shown as 1:1, which is changeable for other applications. The ratio between the pinion gear 188 and sector gear 190 is shown as 8:1; this is also changeable for other applications. Therefore, during a forward transfer stroke, the crank arm 58 rotates 360° clockwise with respect to the transfer beam 66 and housing 155, driving the input shaft 154 of the mechanism of FIG. 9 identically. As previously described, this causes the output shaft 168 and the bevel gear 180 mounted thereon to rotate 180° counterclockwise according to curve A of FIG. 15. This movement is proportionally transmitted through bevel gear 182, shaft 184, and pinion 188 to the sector gear 190, which, together with the mechanical hand 76 rotating with it, rotate 45° counterclockwise as viewed in FIG. 17. This rotation of the hand 76 again is represented by curve A of FIG. 15.

Still another technique for coupling the relative rotation of the crank arm 58 to the mechanical hand is shown in FIGS. 18 and 19; in this case, a crank drive mechanism is employed. Referring to these figures, the crankpin 62 is extended through the transfer beam 66 and a pinion gear 200 is mounted thereon. A crank drive gear 202 is mounted on an idler shaft 204, journalled in the transfer beam through bearings 206 and 208. Pinion 200 and gear 202 are formed to mesh with each other and operate with a 2:1 ratio. A spherical headed crankpin 210 is eccentrically mounted on the crank drive gear 202; and a connecting rod 212 is rotatably connected, at its one end, to the spherical headed crankpin 210. At its other end, the connecting rod 212 is rotatably connected to a spherical headed drive pin 214 mounted in an actuator arm 216. The actuator arm 216 is mounted on, and drives a shaft 218 suitably journalled in a bracket 220 mounted on the transfer beam 66. The mechanical hand 76 is mounted on the outboard end of shaft 218 and rotates with it and the actuator arm 216.

During a forward transfer of the system, the crank arm 58, crankpin 62 and pinion gear 200 rotate 360° clockwise with respect to the transfer beam 66. This rotation of the pinion gear 200 drives the crank gear 202 180° counterclockwise as viewed in FIG. 18. The connecting rod 212 transmits this motion to the actuator arm 216 through pin 214 causing it to reach the position 216A as shown in FIG. 19. It will be noted that one end of the connecting rod 212 rotates with the pin 210 in the vertical plane of rotation of gear 202, and the other end of the connecting rod rotates with the pin 214 in the inclined plane of the actuator arm 216, necessitating the spherical bearing connections at pins 210 and 214. It can further be seen that at each end of the stroke the centerline of the connecting rod 212, or its extension, intersects the axis of shaft 204, creating a stroke from bottom dead center to top dead center in conventional crank drive terminology. Under these conditions, the angular movement of actuator arm 216, and the mechanical hand 76 which rotates with it, related to the input movement rotation of crank arm 58 is shown by cruve B of FIG. 15. With the proportions shown in FIGS. 18 and 19, the total angular rotation of actuator arm 216 is approximately 68°; this is obviously variable by changing the eccentricity of pin 210 on gear 202 and/or by changing the length of actuator arm 216. While the dwell characteristics of the embodiment of FIGS. 18 and 19 are relatively poor, applications arise in which little or no rotation dwell is required and this embodiment can be usefully employed.

Another method of coupling the mechanism of FIG. 9 to the mechanical hand rotation system is shown in FIGS. 20 and 21. The mechanical hand 76 is mounted on a shaft 230 suitably journalled in a bracket 232 mounted on the transfer beam 66. It will be noted that in this example, the axis of rotation of the mechanical land is inclined at an angle of approximately 45°. An actuator arm 234 is fastened to the shaft 230 for driving.

The mechanism of FIG. 9 is enclosed in the housing 155 which is mounted on the transfer beam 66. The input shaft 154 of this mechanism is directly coupled to or made integral with the crankpin 62. The housing 155 and mechanism is orientated to bring the axis of the output shaft 168 reasonably close to the plane of rotation of the actuator arm 234. The output shaft 168 extends through the housing 155, and on it is mounted a drive crank 236. A spherical headed crankpin 238 is mounted on the outboard end of the drive crank 236, and on it is journalled a connecting rod 240. The other end of this connecting rod is pivotally connected to the actuator arm 234, again through a spherical headed pin 242.

In FIGS. 20 and 21, the drive crank 236, connecting rod 240, and actuator arm 234 are shown in their position corresponding to the position of the carriage 24 in FIG. 1, i.e., in the starting position prior to a forward transfer stroke. As the carriage 24 is moved forward through its stroke, the crank arm 58 is rotated 360° clockwise with respect to the transfer beam 66 as previously described. This rotates the input shaft 154 360° clockwise causing the output shaft 168 to rotate 180° counterclockwise with an accelerated-decelerated motion as shown by curve A of FIG. 15, and by arrow D in FIG. 20. This in turn drives the actuator arm 234, through the connecting rod 240, in the direction shown by arrow E in FIG. 21. At the completion of the forward stroke the drive crank 236, connecting rod 240 and actuator arm 234 reach the positions shown in dotted and respectively noted as 236A, 240A and 234A.

It can be seen that the crank arm 236 and actuator arm 234 again rotate in different planes; hence, the requirement for the spherical pins at each end of the connecting rod 240. Since the crank arm and connecting rod in thermselves comprise a second accelerating-decelerating mechanism, having its own dwell at each end of the stroke (approximately harmonic motion), this effect is superimposed on the dwell of the mechanism of FIG. 9. This increases the dwell in the movement of the actuator arm 234 relative to the rotation of the crank arm 58. This movement relationship is shown by curve C of FIG. 15 and approximates the characteristics of the cam mechanism.

The rotation angle of the actuator arm 234 is shown as 60° in FIG. 21. This is variable by changing the length of the drive crank 236 and/or changing the length of the actuator arm 234.

An illustrative direct drive connection between the relative rotation of the crank arm and the rotation of the mechanical hand is shown in FIGS. 22 and 23. Referring to these figures, the crankpin 62 again is extended through the transfer beam 66 and a bevel gear pinion 250 is mounted thereon. This pinion 250 meshes with a bevel gear 252 mounted on a shaft 254 journalled in a bearing block 256 mounted on the transfer beam 66. At its other end, the shaft 254 carries and drives a sprocket 258, which through a compatible chain 260 drives a sprocket 262 mounted on the shaft 78 journalled in the transfer beam 66. The mechanical hand 76 is again carried and driven in rotation by shaft 78 as shown in FIG. 4.

In this system, FIGS. 22 and 23, the connection between the crank arm rotation and mechanical hand rotation is proportional or linear, and there is no dwell. With the proportions shown, the mechanical hand will rotate 90° during the 360° relative rotation of the crank arm 58 with respect to the transfer beam. This is clearly a very simple and inexpensive mechanism, but it is usable only in such applications where immediate part rotation at the ends of the transfer stroke are acceptable.

A variety of mechanisms have been shown which utilize the relative 360° rotation of the crank arm 58 as an input and whose output is used to rotate a mechanical hand 76, e.g., cam mechanisms, a crank mechanism, or "cycloidal" mechanism of FIG. 9. A variety of means have been shown which interconnect the output of these mechanisms with the rotatable mechanical hand, e.g., pinion and sector gear, sprockets and chain, or linkages. Clearly these various mechanisms and interconnection systems can be interchanged with skillful mechanical design, e.g., the cam mechanism can be connected to the mechanical hand for rotation through a linkage. In each such case, the kinematic relationship must be determined, as illustrated by the curves of FIG. 15, to determine the suitability for a given application.

While only a single mechanical hand was shown as being rotatable in the foregoing embodiments, it is also easily seen that multiple mechanical hands can be rotated with the same or similar systems. Indeed, a different means can be utilized to rotate each of such multiple hands, which can therefore manipulate a workpiece through a variety of spatial orientations as it is progressively transferred. Alternately, multiple mechanical hands can be ganged from a single driven mechanical hand through chains and sprockets, gears, linkages, or comparable interconnecting systems.

What is claimed is:

1. In a workpiece transfer system in which a transfer beam, supporting mechanical hand means, is translated in a generally inverted U-shaped transfer path, created principally by the superposition of the linear motion of a supporting carriage on the rotary motion of crank arm means rotatably mounted on said carriage and rotatably connected to and supporting said transfer beam, that improvement which comprises means for rotating said mechanical hand means with respect to said transfer beam as said transfer beam traverses said transfer path, comprising:
   (a) means for mounting said mechanical hand means for rotation on said transfer beam,
   (b) mechanical drive means mounted on said transfer beam, and driven by said crank arm means,
   (c) rotation drive means interconnecting said mechanical drive means and said mechanical hand means,
   whereby the rotation of said crank arm means relative to said transfer beam drives said mechanical hand means in rotation with respect to said transfer beam, through said mechanical drive means and said rotation drive means.

2. A workpiece transfer system as in claim 1 in which said mechanical drive means comprises:
   (a) an input member connected to and driven by said crank arm means,
   (b) an output member operatively associated with said input member, and
   (c) means interconnecting said input member and said output member in a driving relationship.

3. A workpiece transfer system as in claim 2 in which said means interconnecting said input member and said output member provide a non-proportional driving relationship from said input member to said output member.

4. A workpiece transfer system as in claim 3 in which said means interconnecting said input member and said output member provide a dwell of said output member at each end of the stroke of said transfer system.

5. A workpiece transfer system as in claim 2 in which said input member comprises a cam member and said output member comprises a cam follower member adapted to be driven by said cam member.

6. A workpiece transfer system as in claim 5 in which said cam member is a cylindrical cam and said cam follower member is a pivoted arm supporting a cam follower roller operatively associated with said cylindrical cam.

7. A workpiece transfer system as in claim 1 in which said rotation drive means comprises:
   (a) an eccentric member mounted on said mechanical drive means,
   (b) an actuator arm member mounted on said mechanical hand means, and
   (c) a connecting rod member journalled at its one end to said eccentric member and journalled at its other end to said actuator arm member.

8. A workpiece transfer system as in claim 1 in which said rotation drive means comprises:
   (a) a first rotary member mounted on said mechanical drive means,
   (b) a second rotary member mounted on said mechanical hand means, and
   (c) means interconnecting said first rotary member and said second rotary member in a driving relationship.

9. A workpiece transfer system as in claim 1 in which said rotation drive means comprises:
   (a) a first gear member mounted on said mechanical drive means, and
   (b) a second gear member mounted on said mechanical hand means and operatively associated with said first gear member.

10. A workpiece transfer system as in claim 1 in which said mechanical drive means comprises:
    (a) an output member,
    (b) a drive surface on said output member,
    (c) a rotary member to engage said drive surface in a tangential drive relationship,
    (d) means mounting said output member to guide said drive surface in a predetermined path,
    (e) means mounting said rotary member for rotational motion about its moving center and in driving engagement with said drive surface of said output member,
    (f) a rotative drive member,
    (g) means mounting said rotative drive member for movement in a path generally transverse of said drive surface of said output member,
    (h) means mounting said rotary member in non-rotational relation to said drive member with the axes of said rotary member and said drive member parallel but spaced from each other wherein power rotation of said drive member causes it to rotate about the moving center of said rotary member, and
    (i) means interconnecting one of said members to said crank arm means to impart a rotation to said rotary member while in driving relationship with said drive surface.

11. A workpiece transfer system as in claim 10 in which said rotation drive means comprises:
    (a) a crank member mounted on said output member of said mechanical drive means,
    (b) an actuator arm member mounted in non-rotational relationship with said mechanical hand means, and
    (c) a connecting rod member journalled at one end to said crank member and journalled at its other end to said actuator arm member.

* * * * *